United States Patent [19]

Spence

[11] Patent Number: 4,467,998

[45] Date of Patent: Aug. 28, 1984

[54] HIGH GAIN PNEUMATIC SWITCH

[75] Inventor: Scott L. Spence, Goshen, Ind.

[73] Assignee: Johnson Service Company, Milwaukee, Wis.

[21] Appl. No.: 512,445

[22] Filed: Jul. 11, 1983

[51] Int. Cl.³ .......................................... F16K 31/12

[52] U.S. Cl. .......................................... 251/58; 251/61.1

[58] Field of Search .......................... 251/58, 61.1, 61; 137/822, 823, 824, 115, 116.3; 200/83 P

[56] References Cited

U.S. PATENT DOCUMENTS

| | | | |
|---|---|---|---|
| 2,641,871 | 6/1953 | Ray | 251/58 |
| 2,675,793 | 4/1954 | Ziege | 251/58 |
| 2,770,441 | 11/1956 | Grove | 251/58 |
| 3,251,573 | 5/1966 | Miller | 251/58 |
| 3,400,908 | 9/1968 | Bauer | 251/58 |
| 3,421,732 | 1/1969 | Golden | 251/58 |
| 3,433,910 | 3/1969 | Pravda | 200/83 P |
| 3,761,050 | 9/1973 | Puster | 251/61 |
| 3,861,642 | 1/1975 | Maddocks | 251/61.1 |
| 3,897,041 | 7/1975 | Cowan | 251/61.1 |
| 3,918,677 | 11/1975 | Cowan | 251/61.1 |

*Primary Examiner*—Daniel J. O'Connor

*Attorney, Agent, or Firm*—Larry L. Shupe; John Phillip Ryan; Joseph J. Jochman, Jr.

[57] ABSTRACT

An amplifying pneumatic switch which is responsive to low pressure signals includes a first chamber for receiving an input signal from a first pneumatic pressure source at a first pressure. The first chamber includes a wall formed by a movable, highly resilient diaphragm. A diaphragm plate is disposed generally coextensive with the diaphragm and is responsive to diaphragm movement. A nozzle is coupled to a second source of pneumatic pressure and is sealable for generating a pneumatic output signal at a second pressure. A sealing mechanism including a lever and a plunger coact between the diaphragm and the nozzle for sealing the nozzle in response to the input signal. A spring is provided for biasing the diaphragm plate to a quiescent position in the absence of an input signal.

13 Claims, 12 Drawing Figures

HIGH GAIN PNEUMATIC SWITCH

BACKGROUND OF THE INVENTION

This invention relates generally to pneumatic switches and more particularly, to a high gain pneumatic switch for detecting a very low pneumatic pressure and for generating an output signal at a pressure substantially in excess of the pressure detected.

In heating, ventilating and air conditioning systems used in modern buildings, air ducts are provided for drawing outdoor ambient air into the building, for exhausting air from the building to the outdoors and for air mixing. A typical air handling unit would include a plurality of fans disposed within the duct work for providing air movement. When designing the controls for such HVAC systems, the architect or engineer frequently finds it desirable to predicate the occurrence of a subsequent step in the control strategy upon the occurrence of a preceding step. For example, it may be desirable to energize electric heater strips disposed within the duct only if the appropriate fan is flowing air thereacross. While one may obtain a signal indicative of an operating fan from, for example, an auxiliary contact upon the fan motor starter, the most positive manner in which fan operation may be verified is by sensing the resulting air pressure within the duct. In yet other types of applications, it may be desirable to provide a switch for generating a modulated output signal which is generally proportional to a very low but modulating pressure within the duct. This latter circumstance may be desirable in HVAC systems which use variable speed fans.

In addition to having the capability of detecting and reacting to very low pressures within an air duct, it is often desirable to provide a switch which generates a pneumatic output signal at a pressure which is useful to directly position pneumatic cylinders and the like which may be incorporated in HVAC equipment for positioning dampers or louvers. Such pneumatic cylinders are widely available and suitable for actuation at pneumatic pressures in the 3–20 pounds per square inch gauge (psig) range.

One type of known pneumatic switch is used as a pressure signaling or limiting device and incorporates a sensing chamber having a resilient diaphragm for positioning a snap-acting electrical switch when a predetermined pressure is reached. Examples of such switches are shown and described in U.S. Pat. Nos. 3,178,531 and 3,433,910.

In another type of known switch, a low pressure pneumatic input signal is sensed by a chamber including an elastomeric, impregnated diaphragm confined between two rigid plates. Diaphragm and plate movement is transmitted to a control module by a lever coacting between the diaphragm and the module and pivotably supported at one end. The lever functions to manipulate a plunger and control diaphragm into sealing engagement with a nozzle for generating a pneumatic output signal. The point of contact of the plunger and lever is immediately adjacent the lever pivotable support point and the arrangement of the overall structure results in erratic output signals which impair the performance of carefully engineered systems. An example of such a pneumatic switch is shown in Product Bulletin P5232 of Johnson Controls, Inc.

In yet another type of pneumatic switch, two input pressures are sensed, one on either side of a resilient diaphragm. Movement of the diaphragm caused by a differential between the sensed pressures is used to provide an output signal, the value of which is proportional to the difference between the sensed input signals. The proportional output signal is generated by using the diaphragm to modulate a control nozzle and an example of a switch of this type is shown in U.S. Pat. No. 3,612,085. In a differential switch of another type, diaphragm movement is used to actuate an electrical switch upon the attainment of some predetermined, minimum differential pressure. An example of a switch of this type is shown and described in Bulletin No. 4145-A of Johnson Controls, Inc.

Yet another type of pneumatic apparatus which uses a movable diaphragm, a disk for modulating a flow passage and a lever coacting between the disk and the diaphragm is shown in U.S. Pat. No. 3,160,169. The device shown therein defines a pressure regulator and safety vent valve for use upon combustible gas lines and since it employs only a single source of gas pressure, is incapable of pressure amplification or of detecting and responding to pressures at very low levels.

While these devices have heretofore been generally satisfactory for detecting pressures in an HVAC system, they tend to be characterized by certain disadvantages. In particular, certain of them are capable of functioning as a differential switch, i.e., of reacting to a difference between two pressures sensed thereat. Other switches such as that shown in the aforementioned bulletin of Johnson Controls, Inc. are capable of responding to very low duct pressures but are adapted to provide an electrical output signal and are therefore wholly incapable of providing a pneumatic output signal directly, either of a digital type or of a modulated analog type.

A high gain pneumatic switch capable of sensing very low pressures and which is adapted to utilize a plurality of pressure sources for providing an input signal and for generating a high gain output signal which may be digital or analog in nature would be a distinct advance in the art.

It is an object of the invention to provide an amplifying pneumatic switch which is responsive to very low pressure signals.

Another object of the present invention is to provide a pneumatic switch which includes a chamber for receiving an input signal from a first pneumatic pressure source at a very low pressure.

Another object of the present invention is to provide a pneumatic switch which incorporates a nozzle sealable for generating a pneumatic output signal from a second pneumatic pressure source where the signal may be used to directly position a pneumatic cylinder.

Yet another object of the present invention is to provide an amplifying pneumatic switch which incorporates a modulating assembly coacting between the first chamber and the nozzle for output signal generation.

Still another object of the present invention is to provide a pneumatic switch wherein the output pressure is generally proportional to the input pressure. How these and other objects are achieved will become more apparent from the description thereof taken in conjunction with the accompanying drawing.

SUMMARY OF THE INVENTION

In general, an amplifying pneumatic switch which is responsive to low pressure signals includes a first chamber for receiving an input signal from a first pneumatic pressure source at a first pressure. The first chamber includes a wall formed by a movable, highly resilient diaphragm. A diaphragm plate is disposed generally coextensive with the diaphragm and is responsive to diaphragm movement. A nozzle is coupled to a second source of pneumatic pressure and is sealable for generating a pneumatic output signal at a second pressure. A sealing mechanism including a lever and a plunger coact between the diaphragm and the nozzle for sealing the nozzle in response to the input signal. A spring is provided for biasing the diaphragm plate to a quiescent position in the absence of an input signal.

DETAILED DESCRIPTION OF THE PREFERRED EMBODIMENT

Figure 1:
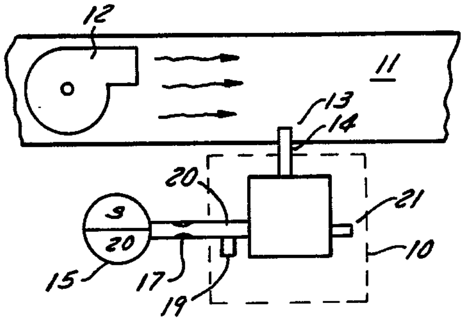
FIG. 1 is a simplified pictorial diagram of the switch of the present invention shown in conjunction with a cross-sectional side elevation view of a duct confining a moving air stream.
Figure 3:
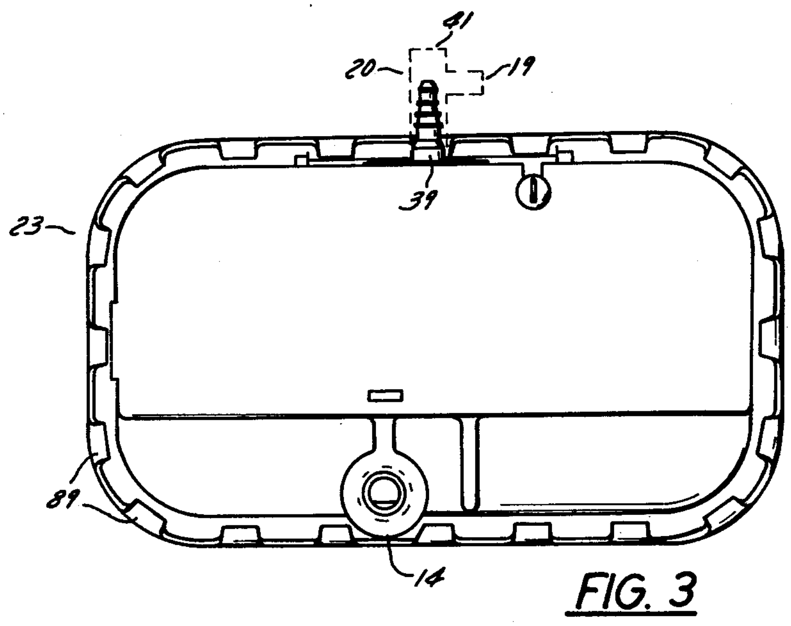
FIG. 3 is a top plan view of the switch of FIG. 2 taken along the plane 3—3 thereof and in full representation with portions shown in phantom.

Referring to FIG. 1, the switch 10 of the present invention is shown in conjunction with an air duct 11 which forms a portion of an air handling unit within an HVAC system. A fan 12 is disposed in the duct 11 for moving air therethrough while a sensing tube 13 is coupled between the duct 11 and the inlet port 14 of the switch 10. The sensing tube 13 is open at the end interior of the duct 11 and may be disposed as shown for sensing the static duct pressure or may be formed to define an L-shaped pitot tube facing upstream to the flow of air for sensing the total pressure in a manner known to those skilled in the art. A second source of pneumatic pressure 15 is coupled to the switch 10 and has a pneumatic restrictor 17 such as an orifice disposed intermediate the source 15 and the switch 10. A pneumatic output signal is provided at the control port 19, provided by a T-fitting 20, while a vent port 21 is used for exhausting pneumatic fluid to atmosphere during certain phases of the operation of the switch 10. It will be appreciated that an appropriate pneumatic device (not shown) is to be coupled to port 19 for actuation.

Referring next to FIGS. 1, 2, 3 and 4, a preferred embodiment of the switch 10 of the present invention is shown to include a housing 23 having a rigid lower wall 25 and a movable, highly resilient main diaphragm 27 disposed generally coextensive with the wall 25 for defining a first chamber 29. The wall 25 includes an aperture 31 to which is coupled the inlet port 14 for providing pneumatic fluid communication between the air duct 11 and the chamber 29. A diaphragm plate 33 is disposed generally coextensive with the diaphragm 27 and is responsive to diaphragm movements. A nozzle 35 is coupled to the second source of pneumatic pressure 15 by a tube 37, a barbed connector 39 and the anterior end 41 of the fitting 20. The nozzle 35 is sealable for generating a pneumatic output signal at the control port 19 at up to a second pressure. Means are provided for sealing the nozzle orifice 45 in response to the input signal. A preferred sealing means is embodied as a modulating assembly 44 which includes lever means 47 and plunger means 49 for controllably modulating the output pressure in response to modulations in the input pressure. It is to be appreciated that the switch 10 of the present invention is adapted to be used for providing a modulated, analog output signal or, in the alternative, may be used for generating a digital signal such as a higher pressure output signal when the nozzle 35 is sealed and a low pressure output signal when the nozzle 35 is open.

The lever means 47 preferably includes a force amplifying lever 51 pivotably supported at a first end 53, coacting with the diaphragm plate 33 at a second end 55 and coacting with the plunger means 49 at a point 57 intermediate the first end 53 and the second end 55. The plunger 49 is supported for axial movement and includes a stem 59 for contacting the lever 51 and a head 61 for effecting controlled, analog or digital closure of the nozzle orifice 45. A biasing spring 63, preferably of the generally planar leaf type, is attached at its first end 65 to the housing 23 and has its second end 67 positioned to bear upon the lever second end 55 for biasing the diaphargm plate 33 to the illustrated quiescent position in the absence of an input signal. While adjustment of the spring 63 is not required for operation of the switch 10, greater flexibility in application will result if the spring mechanism is constructed to include a movable fulcrum 69 which coacts with the spring 63 for adjusting the spring rate thereof. In that manner, one may thereby change the minimum value of that first pressure at which the switch 10 is responsive to generate an output pressure. The movable fulcrum 69 includes an adjusting screw 71 supported for rotation by the housing 23 and a fulcrum plate 73 threadably coupled to the screw 71 and having a lip member which slidably bears upon the top surface of the spring 63. Rotation of the adjusting screw 71 will cause the plate lip member to move up or down the ramp defined by the spring 63, thereby changing the distance between the fulcrum point and the point at which the spring 63 bears upon the lever end 55. As an option, greater range adjustability will result if the biasing spring 63 is formed to include a teardrop shaped aperture (not shown) in that portion of the spring 10 which is in contact with the fulcrum plate 73.

Figure 2:
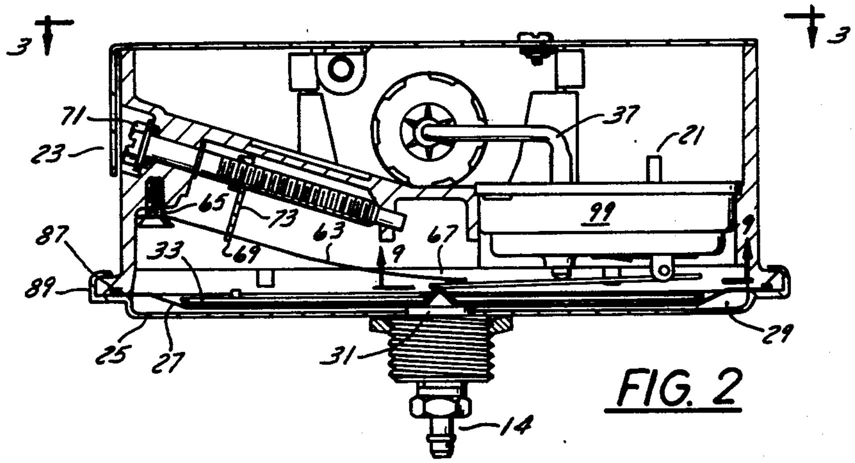
FIG. 2 is a side elevation view, partly in cross-section of the switch of FIG. 1.

As an input signal is introduced into the first chamber 29, the diaphragm 27, plate 33 and the second end 55 of the lever 51 are urged upwardly in the view of FIG. 2, thereby causing the plunger head 61 to commence closure of the nozzle orifice 45. Pneumatic fluid from the second source 15, otherwise permitted to flow relatively freely through the orifice 45 to the vent port 21 at a pressure of about 1 psig, will thereby have its flow path impeded with a consequent rise in the level of pressure at the control port 19. At full closure of the nozzle orifice 45, the pressure at the port 19 will be substantially equal to the presence of the second source 15. In typical pneumatic control system adapted for HVAC applications, the pressure of this source 15 will be about 20 psig.

More particularly and for optimum functioning of the switch 10 in a smooth manner which exhibits low hysteresis, it is preferred that the diaphragm 27 be constructed to exhibit an extremely low spring rate. Accordingly and referring next to FIGS. 2, 5, 6 and 7, the diaphragm 27 is shown to include an outer sealing bead 75 generally defining a rectangular shape with rounded corners. The diaphragm web 77 is connected to the sealing bead 75 by a convolution 79 which is homogeneously molded between the bead 75 and the web 77. A pair of upwardly projecting fingers 81 are molded integral with the web 77 for engaging correspondingly located holes 83 in the diaphragm plate 33 for position retention. A raised X-shaped member 85 is molded integral with the web 77 and positioned adjacent the aperture 31 for preventing the diaphragm 27 from adhering to the wall member 25 in the presence of precipitation moisture which may form in the first chamber 29. In a preferred embodiment, the diaphragm 27 is precision molded as a unitary structure, has a web 77 of approximately 0.015 inches in thickness and a convolution 79 of approximately 0.008 inches in thickness. The effective area of the diaphragm 27 in one preferred embodiment is about 8.3 square inches. A preferred diaphragm 27 is continuously formed; that is, is formed with no discontinuities such as apertures. A material found useful in molding the diaphragm 33 is Buna-N having a hardness of 40 durometer.

A peripheral groove 87 is formed in the lower rim of the housing 23 and is sized to receive the diaphragm bead 75 with a snug fit. The bead 75 is clamped in the groove 87 and retained by tabs 89 formed in the lower wall 25 which may be bent upwardly and inwardly about the rim, thereby forming a diaphragm retaining, gas tight seal.

Figure 8:
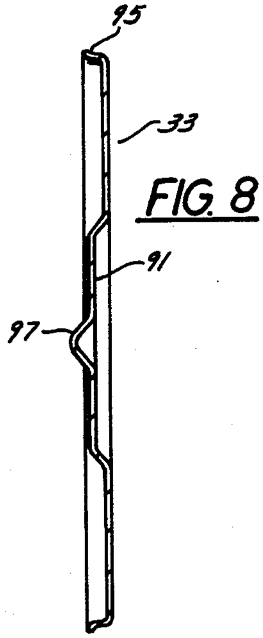
FIG. 8 is a cross-sectional end elevation view of the plate of FIG. 7 taken along plane 8—8 thereof.
Figure 7:
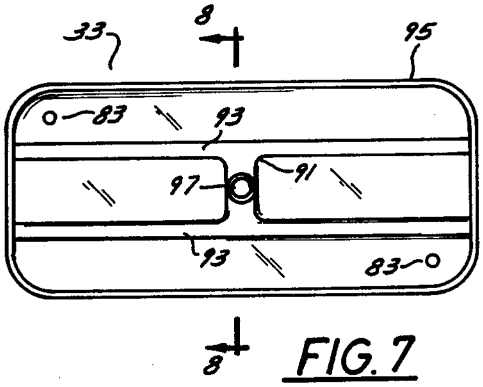
FIG. 7 is a top plan view of the diaphragm plate of the switch as it appears if viewed in isolation.

In order to transmit the force generated by the movable diaphragm 27 to the lever means 47, a preferred switch 10 includes a diaphragm plate 33 as shown in FIGS. 2, 7 and 8. A suitable plate 33 is formed of a rigid, lightweight material such as aluminum to define, in plan view, a generally rectangular shape having rounded corners. The plate 33 includes a lateral, centrally disposed stiffening rib 91 connected between a pair of longitudinal, spaced-apart stiffening ribs 93 with the ribs thereby defining an H-shape. Additional stiffening is provided by forming an upwardly turned edge 95 about the periphery of the plate 33. The ribs 91, 93 and the edge 95 thereby cooperate to prevent warping, dimpling or "oil canning" of the plate 33 and permit the plate 33 to precisely follow diaphragm movement. A preferred plate 33 will have a length and width selected to slightly overlap the inner rim of the diaphragm convolution 79. A nose member 97 defining an upwardly projecting truncated cone is formed in the lateral rib 91 for transmitting motion and force to the second end 55 of the lever 51.

Figure 4:
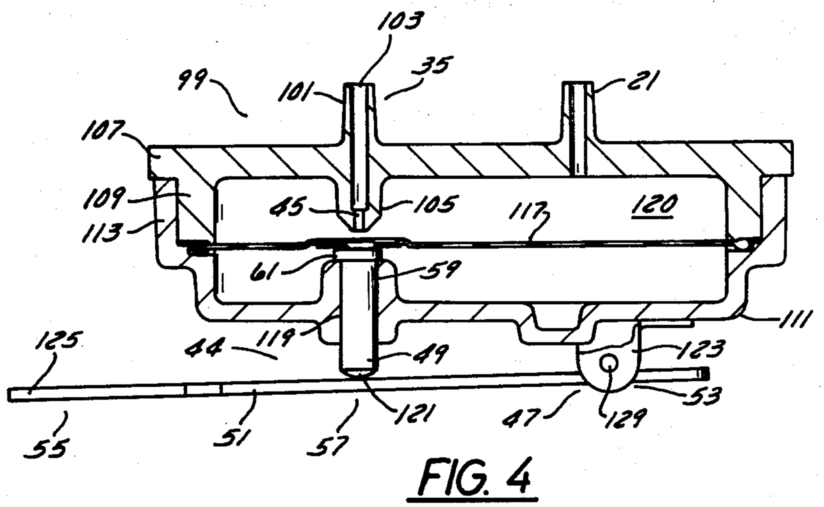
FIG. 4 is a side elevation view of the control module portion of the inventive switch taken along the plane 4—4 of FIG. 9 and partly in full representation.
Figure 9:
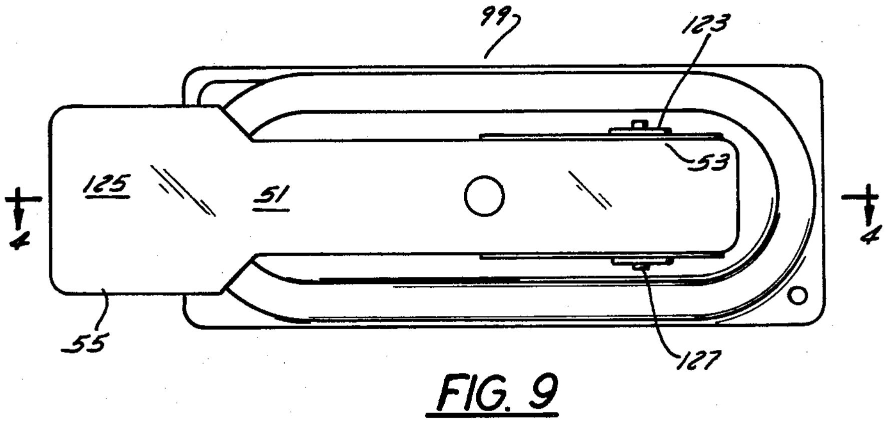
FIG. 9 is a bottom plan view of the control module portion of the inventive switch taken along the plane 9—9 of FIG. 2.
Figure 5:
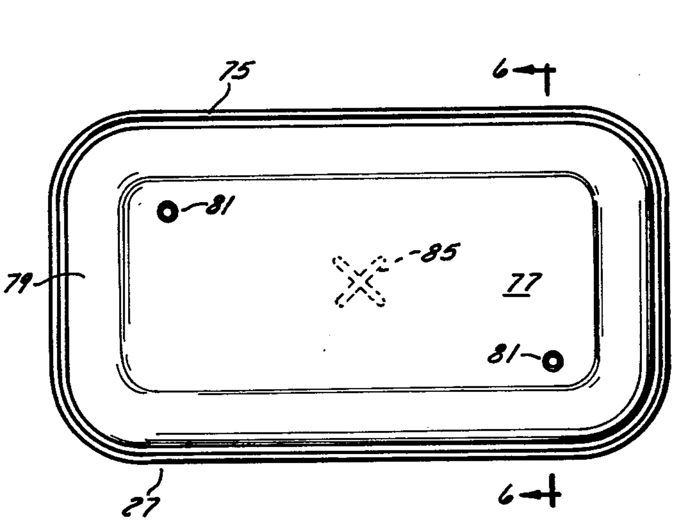
FIG. 5 is a top plan view of the main diaphragm of the switch as it appears if viewed in isolation.
Figure 6:
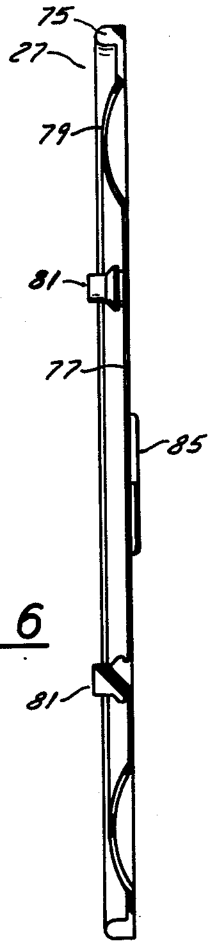
FIG. 6 is a cross-sectional end elevation view of the diaphragm of FIG. 5 taken along the plane 6—6 thereof.

Referring next to FIGS. 2, 4 and 9, the control module 99 is shown to include a nozzle 35 adapted to be coupled to a second pneumatic pressure source 15. The nozzle 35 is sealable for generating a pneumatic output signal at the port 19 at a second pressure. Means are provided for sealing the nozzle 35 in response to the input signal, such means preferably being embodied as a modulating assembly 44 having a plunger 49 for effecting nozzle sealing and a lever 51 responsive to movement of the diaphragm 27 and coacting with the plunger 49 for such sealing.

More particularly, the nozzle 35 includes an upper portion 101 having a longitudinal passage 103 formed therein and a lower jet 105 formed as a truncated cone and constructed with an orifice 45 therethrough of reduced diameter. In a preferred embodiment, this orifice 45 is about 0.030 inches in diameter. A port 21 is provided for venting the pneumatic fluid during those times when the jet 105 is less than fully sealed. Both the nozzle 35 and the port 21 are supported in a cup-shaped upper housing member 107 which includes a downwardly-projecting lower rim 109.

A cup-shaped lower housing 111 includes an upwardly projecting side wall 113 sized to receive the rim 109 with snug, retentive fit so as to compress the sealing bead 115 and provide a gas tight seal therebetween. Attachment of the rim 109 and side wall 113 is preferably by ultrasonic bonding to avoid the performance-impairing presence of glue or bonding solvents upon the control diaphragm 117 described below. A passage 119 is formed in the lower housing 111 and is sized to receive the plunger 49 with closely, smoothly sliding fit. The plunger 49 is terminated at one end by an arcuate surface 121 and at the other end by an enlarged, disk-shaped head 61 having a generally planar top surface for providing sealing engagement with the jet 105. Since the forces transmitted by the lever 51 and plunger 49 are extremely low, it is preferred that the engaging surfaces of the plunger 49 and the passage 119 be extremely smooth for providing very low friction movement of the plunger 49.

The lever 51 is formed of a rigid, generally planar material and is pivotably supported at its first end 53 by a mounting clevis 123 coupled to the lower housing 111. At its second end 55, an enlarged paddle section 125 is provided for engaging the nose member 97 of the diaphragm plate 33 at the paddle lower surface and for engaging the biasing spring means 63 at its upper surface. The height of the clevis 123 and the length of the plunger 49 are selected such that the spring means 63 lightly touches the lever 51 when the diaphragm plate 33 is in a quiescent position in the absence of an input signal and with the lever 51 lightly touching the plate nose member 97. In order to obtain the desired force amplification between the nose member 97, the lever 51 and the plunger 49, it is preferable that the ratio of the distance between the centerline of the clevis pin 127 and the nose member 97 of the diaphragm plate 33 to the distance between the clevis pin centerline and the point of contact of the arcuate surface 121 closely approximates 2.0:1.

From the foregoing description, it will be apparent to one of ordinary skill in the pneumatic control arts that if the structure defining the first chamber 29 and the structure defining the control module 99 are formed as separate but coacting devices, they will be pneumatically isolated one from the other. However, for convenience in installation of the novel switch 10, it is preferred that the apparatus forming the first chamber 29 and that which forms the control module 99 be arranged as a unitary structure as generally shown in FIG. 2. With the illustrated construction, a sudden loss of input signal and consequent sudden retraction of the plunger head 61 away from the jet 105 may result in the substantially instantaneous introduction of relatively high pressure fluid into the control module 99. Any leakage of this fluid between the plunger 49 and the passage 119 could cause a rupture in the sensing diaphragm 27. Accordingly, a preferred embodiment also includes a control diaphragm 117 which cooperates with the upper housing 107 to define a control chamber 120 for pneumatically isolating the sensing medium from the control medium to aid in the prevention of the aforedescribed eventuality.

Figure 10:
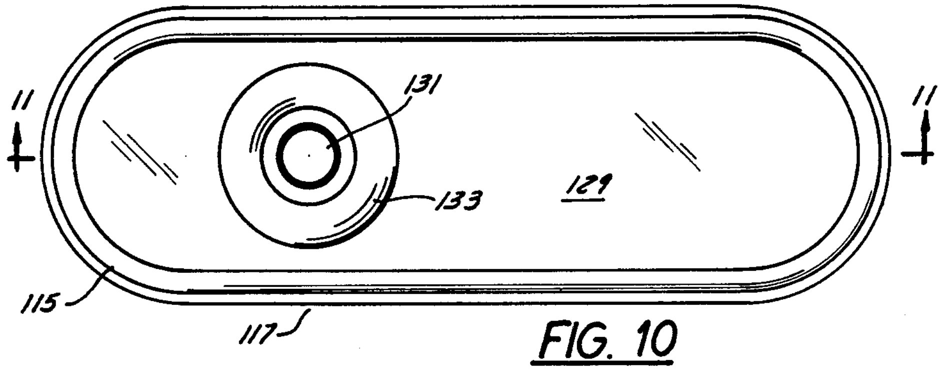
FIG. 10 is a top plan view of the control diaphragm of the inventive switch as it appears if viewed in isolation.
Figure 11:
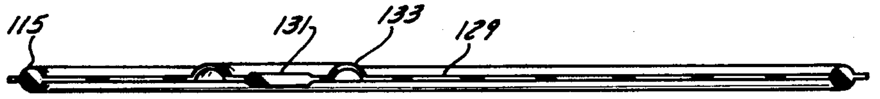
FIG. 11 is a cross-sectional side elevation view of the diaphragm of FIG. 10 taken along the plane 11—11 thereof.

Referring next to FIGS. 10 and 11, the continuously formed control diaphragm 117 is shown to include an outer sealing bead 115 defining a generally rectangular shape with rounded ends. The diaphragm 117 also includes a thin, generally planar web member 129 and a circular sealing pad 131 positioned in the web member 129 to be intermediate the jet 105 and head 61 for aiding in jet sealing. The pad 131 is supported in the web member 129 and at the pad outer perimeter by an annular, convoluted portion 133. It is preferred that this diaphragm 117 likewise have a very low spring rate and a satisfactory diaphragm 117 will be formed of Buna-N material, 40 durometer hardness, with a web 129 and convoluted portion 133 of, in one embodiment, about 0.008 inches thickness and a pad 131 of about 0.025 inches thickness.

Figure 12:
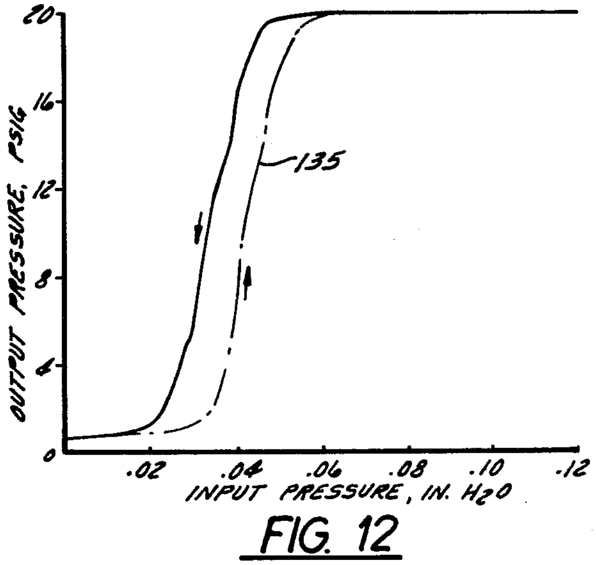
FIG. 12 is an exemplary curve depicting the operating characteristics of the switch of the present invention.

In operation, the inlet port 14 is coupled to a first pneumatic pressure source such as an air duct 11 and the nozzle 35 is coupled to a second pneumatic pressure source 15 such as a building pneumatic control bus at about 20 psig. If the duct fan 12 is inoperative, no input signal will be sensed at the first chamber 29, the diaphragm 27 and plate 33 will be in the quiescent position illustrated in FIG. 2 and the stream of pneumatic fluid from the restricted second source 15 will be permitted to flow unimpeded through the jet 105 and out the port 21 at a jet orifice pressure drop of about 1 psig. If the air duct fan 12 is a single speed device and if made operative, an input signal will be sensed at the first chamber 29. So long as this input pressure exceeds about 0.06 inches water column equivalent pressure, the resulting movement of the diaphragm plate 33, lever 51 and plunger 49 will fully seal the jet 105, prevent the further escape of pneumatic fluid and cause the pressure in the port 19 to rise to substantially that of the second source. If the duct fan 12 is a variable speed device operated at less than maximum rating, the resulting input pressure signal occurring between 0.02 inches water column and 0.06 inches water column will cause the lever 51 and plunger 49 to modulate or partially close the jet 105 and a reduced output pressure occurring in a first range of between 1 psig and 20 psig will result. The reader will be aided by the known conversion factor wherein a pressure in inches water column equivalent multiplied by 0.03613 will yield the equivalent pressure in pounds per square inch. The exemplary operating curve shown in FIG. 12 illustrates these operations and in particular, illustrates that the gain of the switch 10 is on the order of 1000:1 as represented by the slope of the curve first leg 135. Further, the ratio of the first, input pressure, 0.06 inches water, to the second, output pressure, 20 psig, at jet closure will be on the order of 9000:1. It is to be appreciated that the pressure values described herein are exemplary and that other ranges of input and output pressures may result from the appropriate scaling of the design of the switch 10.

While only a single, preferred embodiment of the inventive switch has been shown as described, it is not intended to be limited thereby but only by the scope of the appended claims.

I claim:

1. An amplifying pneumatic switch responsive to low pressure signals and including:

a first chamber for receiving an input signal from a first pneumatic pressure source at a first pressure, said first chamber including a member formed by a continuously formed, highly resilient diaphragm molded of a homogeneous material;

a single diaphragm plate disposed exteriorly of said first chamber and generally coextensive with and responsive to the movement of said diaphragm;

a jet adapted to be coupled to a second pneumatic pressure source and sealable for generating a pneumatic output signal at a second pressure;

means for sealing said jet in response to said input signal, said sealing means including lever means and plunger means coactively responsive to movement of said diaphragm for jet sealing;

said lever means including a force amplifying lever pivotably supported at a first end, coacting with said diaphragm plate at a second end and coacting with said plunger means at a point generally midway between said first end and said second end, and;

spring means for biasing said diaphragm plate to a quiescent position in the absence of said input signal.

2. The invention set forth in claim 1 wherein said sealing means is disposed intermediate said first chamber and said jet, said lever means being responsive to movement of said diaphragm and said plunger means being responsive to movement of said lever means.

3. The invention set forth in claim 2 wherein said first pressure is less than about 0.2 inches water column equivalent and said second pressure is in excess of 15 psig.

4. The invention set forth in claim 2 wherein the ratio of said second pressure to said first pressure is at least 5000:1.

5. The invention set forth in claim 4 wherein said spring means includes a leaf spring and a movable fulcrum coacting with said leaf spring for adjusting the spring rate thereof, thereby changing the minimum value of said first pressure at which said switch is responsive to generate said output pressure.

6. The invention set forth in claim 4 wherein said switch exhibits a gain of at least 800:1.

7. A high gain, pneumatic modulating switch responsive to very low pressure signals, said switch including:

a rigid first wall member;

a highly resilient, continuously formed sensing diaphragm molded of a homogeneous material and cooperating with said first wall member to define a sensing chamber for detecting a pneumatic input pressure modulating within a first range of pressure;

a single diaphragm plate disposed exteriorly of said sensing chamber to be generally coextensive with and responsive to the movement of said sensing diaphragm;

spring means for biasing said plate to a quiescent position in the absence of said input pressure;

a rigid housing member;

a highly resilient, convoluted control diaphragm cooperating with said housing member to define a control chamber, said control chamber being pneumatically isolated from said sensing chamber;

a control jet disposed in said control chamber and adapted to be controllably modulated by said control diaphragm for generating a pneumatic output pressure modulating within a second range of pressure, and;

a modulating assembly coacting between said plate and said control diaphragm for controllably modulating said output pressure in response to modulations in said input pressure.

8. The invention set forth in claim 7 wherein said modulation of said output pressure is generally proportional to said modulation of said input pressure.

9. The invention set forth in claim 8 wherein said modulating assembly includes pivotably-movable lever means and axially-movable plunger means coacting between said sensing diaphragm and said control diaphragm for positioning movement of said control diaphragm in response to movement of said sensing diaphragm.

10. The invention set forth in claim 7 wherein said first range of pressure is between about 0.02 inches water column and about 0.06 inches water column and said second range of pressure is between about 1 psig and about 20 psig.

11. The invention set forth in claim 10 wherein said proportionality is generally directly proportional.

12. The invention set forth in claim 7 wherein said spring means includes a leaf spring and a movable fulcrum coacting with said leaf spring for adjusting the spring rate thereof, thereby changing the minimum value of said input pressure to which said switch is responsive.

13. The invention set forth in claim 7 wherein said switch exhibits a gain of at least 800:1.

* * * * *

UNITED STATES PATENT AND TRADEMARK OFFICE

CERTIFICATE OF CORRECTION

PATENT NO. : 4,467,998

DATED : August 28, 1984

INVENTOR(S) : Scott L. Spence

It is certified that error appears in the above-identified patent and that said Letters Patent are hereby corrected as shown below:

Column 5, Line 9, "presence" should be --pressure--

Column 7, Line 23, after "and" insert --the--

Signed and Sealed this

*Second* Day of *April 1985*

[SEAL]

*Attest:*

DONALD J. QUIGG

*Attesting Officer* *Acting Commissioner of Patents and Trademarks*